(No Model.) 2 Sheets—Sheet 1.
B. F. SHUART.
SCRAPER.
No. 499,477. Patented June 13, 1893.
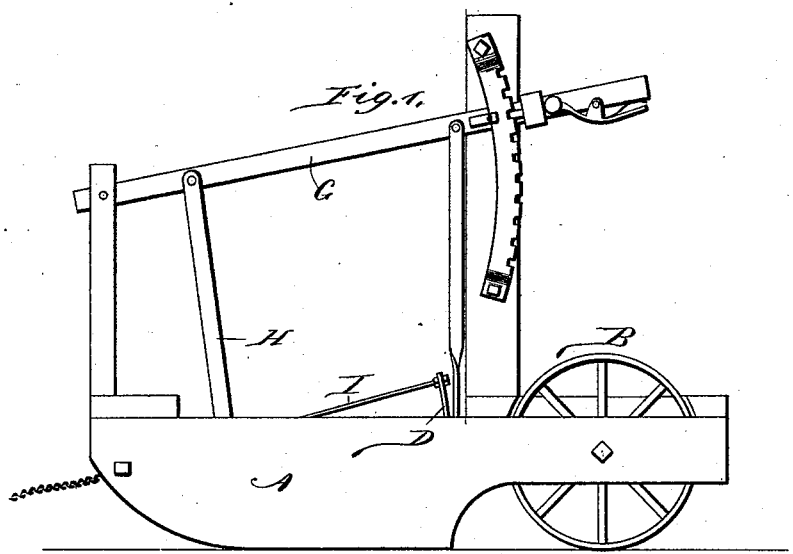
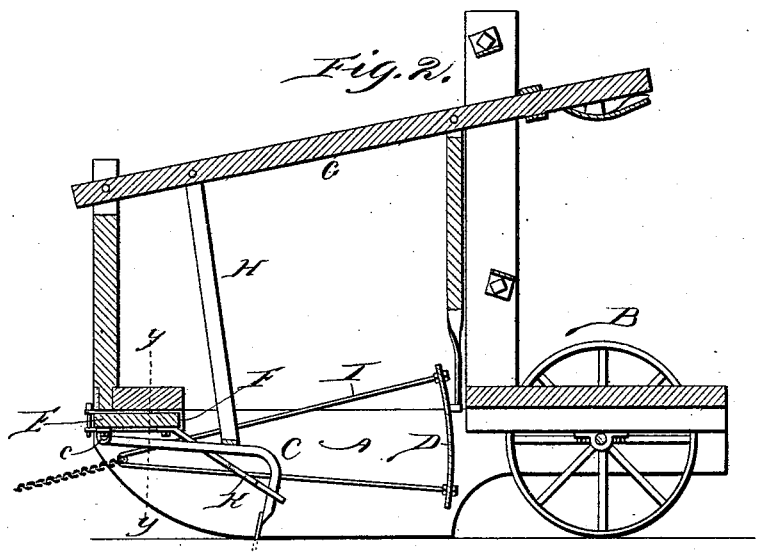
Witnesses
W. D. Middleton
Rola M. Wagner.
Inventor
Benjamin F. Shuart
By Chas. G. Page
Atty.

(No Model.) 2 Sheets—Sheet 2.
B. F. SHUART.
SCRAPER.
No. 499,477. Patented June 13, 1893.
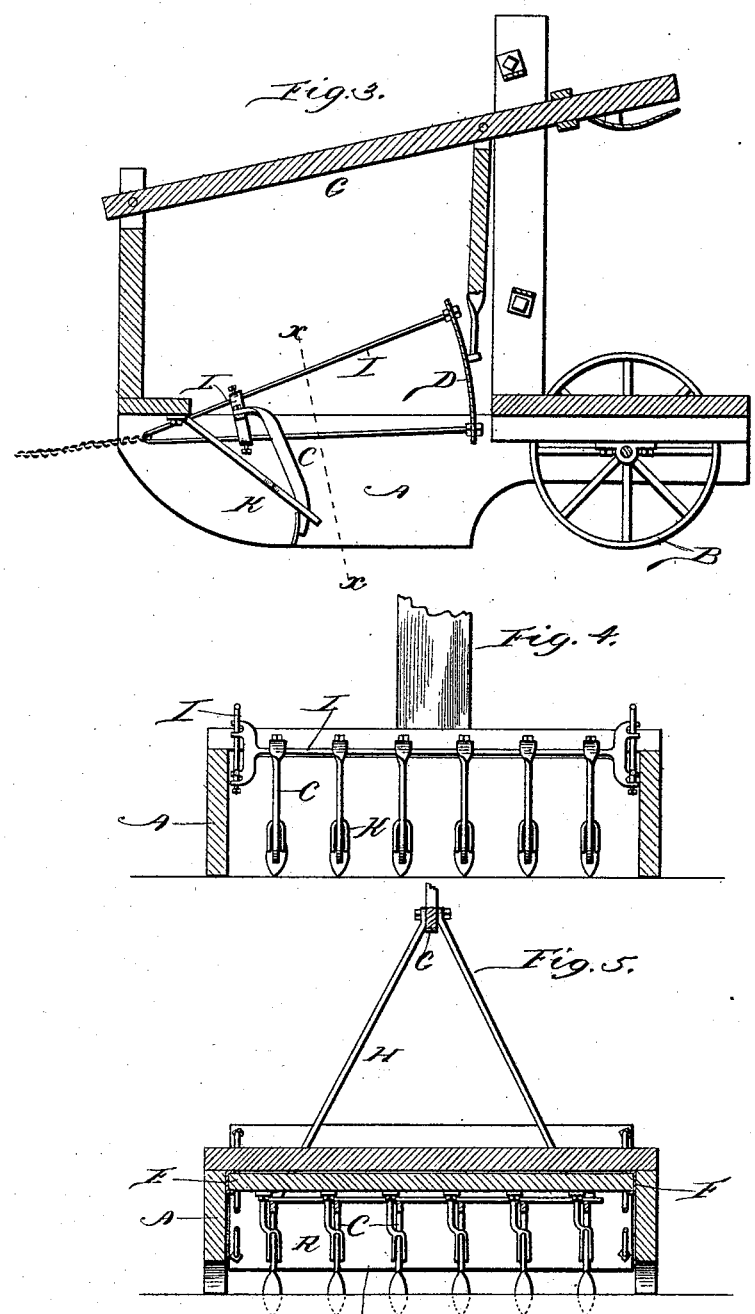
Witnesses
W. D. Middleton
Rita M. Wagner
Inventor
Benjamin F. Shuart
By Chas. G. Page
Atty

UNITED STATES PATENT OFFICE.

BENJAMIN F. SHUART, OF BOZEMAN, MONTANA.

SCRAPER.

SPECIFICATION forming part of Letters Patent No. 499,477, dated June 13, 1893.

Application filed March 16, 1893. Serial No. 466,204. (No model.)

*To all whom it may concern:*

Be it known that I, BENJAMIN F. SHUART, a citizen of the United States, residing at Bozeman, in the county of Gallatin and State of Montana, have invented a certain new and useful Improvement in Scrapers, of which the following is a specification.

My invention relates to scrapers of the kind embodied in Letters Patent of the United States No. 476,691, granted and issued to me, June 7, 1892, and further set forth in my applications, Serial No. 442,975, filed August 13, 1892, and Serial No. 465,528, filed March 11, 1893, for Letters Patent of the United States, the general plan of the scraper being the arrangement of a swinging bail and a blade attached thereto between sides or fenders which prevent the scraped up earth from spreading while the same is being pushed forward by the blade. By such arrangement I provide a blade which can be forced to a suitable depth in the soil in contradistinction to the bowl of a scoop-scraper which can only be used for scooping up loose soil on the surface. The sides or fenders may be arranged to form runners or as in my application, Serial No. 465,528, the body frame can be wheel-supported fore and aft and the sides or fenders can be arranged for vertical movement or adjustment. The blade raising and lowering device may consist of any suitable arrangement of lever or hand wheel and suitable adjuncts. In operating this scraper for the purpose of leveling the ground I find it of great service in arid regions where irrigation is necessary and where it is essential to prepare the ground for irrigation that the field should be level. In thus using my scraper I frequently force the blade into the soil proportional to the height of an elevation in the field which is to be leveled off. At times, however, the ground is exceedingly hard and in order therefore to facilitate the work and reduce labor I have herein provided as a matter of improvement suitable means for breaking up the ground in advance of the blade. At certain seasons the ground breaking device will inevitably become clogged with weeds, stubble and the like and as a matter of further improvement I have herein provided means for effectively cleaning this ground breaking device. I also arrange the ground breaking device so that it can be depressed correspondingly with the depression of the blade and I also prefer arranging the ground breaking device so that it can be removed and applied as an attachment auxiliary to the blade thereby permitting it to be removed at such times as it may not be needed.

In the accompanying drawings,—Figure 1 represents the scraper in side elevation. Fig. 2 is a longitudinal central section through the same on a vertical plane and shows the ground breaking device and cleaner removably attached to the forward end of the machine and arranged so that the depression and elevation of the ground breaking device can be effected simultaneously with the corresponding movement of the blade by means of a connection between the ground breaking device and the device employed for raising and lowering the blade. Fig. 3 is a like view illustrating the principle of the foregoing attained by attaching the ground breaking device to the swinging bail. Fig. 4 is a cross section through the machine on line $x-x$ in Fig. 3 looking toward the forward end of the machine. Fig. 5 is cross section through the machine on line $y-y$ in Fig. 2 looking toward the rear end of the machine.

In the machine herein illustrated, I have shown the body frame provided with runners A which form the sides or fenders and have provided the machine with rear wheels B only. It is understood however that I may provide the scraper with front and rear wheels and that the sides or runners A can be pivotally held at the forward end of the body frame so that they can be swung up and down as in my application Serial No. 442,975.

In Figs. 1, 2 and 5, the ground breaker C comprises a set of teeth which may be similar to the teeth of an ordinary cultivator. The ground breaker thus constructed is arranged in advance of the blade D and is pivotally held at the forward end of the machine, the arrangement being such that it can rise and fall with the blade and be depressed in the soil correspondingly with the depression of the blade. In order to permit the removal of this ground breaker it is pivotally attached as at $c$ to a holder E consisting for example of a cross-bar which is removably held at its ends by supports F on the frame of the machine. As a means for raising and lowering said ground breaker simultaneously with the blade I have in said figures connected it with the blade raising and lowering lever G by a link or hanger H which for example can be pivotally attached to said lever, it being understood however, that I may employ any other arrangement of lever or raising and lowering device, and connect the same in any suitable way with the ground breaker, it being here noted that this arrangement involves the feature of a ground breaker arranged in advance of the blade and movable up and down with said blade and that it involves as a further feature the connection of the ground breaker with such means as may be employed for raising and lowering the blade. The blade is attached to a bail I, which is in turn pivotally held at the forward ends of the machine, by which arrangement the blade can rise and fall in an arc of sufficient radius to render the up and down movement of the blade proximately in a vertical plane at the same time however, permitting the blade to enter the soil at such pitch or angle as will insure ready penetration.

The wiper or cleaner K is conveniently attached to the holder E and consists of a set of forked fingers which I arrange to straddle the soil breaking teeth and which are preferably of spring metal. By such arrangement stubble, weeds and the like will be stripped from the teeth when the soil breaker is raised to a suitable height.

In Figs. 3 and 4 the soil breaker C is removably attached to the swinging bail I and to such end it is arranged upon a holder L which is in turn detachably secured upon the bail. This arrangement is particularly convenient where I dispense with a hand lever and provide a raising and lowering device involving a hand wheel as in my application, Serial No. 442,975, since no special connection between the soil breaker and the blade raising and lowering device is necessary.

The wiper or cleaner K in Figs. 3 and 4 is shown attached to the forward end portion of the machine although it can be supported in any other suitable way.

The holder L may be of any suitable construction as for example it can be forked at its ends so as to engage the bail and can be held upon the bail by set screws or other suitable fastening devices.

Where the soil is hard or baked, the soil-breaker can be employed and in such case it can be depressed correspondingly with the blade and thereby permit the latter to do quick and effective work.

I am aware that various prior patents illustrate a soil breaking device arranged in advance of the blade in a scraper and means for raising and lowering the same, and hence I do not broadly claim such a feature.

What I claim as my invention is—

1. A scraper comprising a swinging draft-bail and blade arranged between sides or fenders which prevent the scraped up soil from spreading, a toothed soil breaker positioned in advance of the blade and movable up and down in unison with the rise and depression of the same, substantially as described.

2. A scraper comprising a swinging draft bail and blade arranged between sides or fenders which prevent the scraped up soil from spreading, and a toothed soil breaker arranged for up and down swing in unison with the blade and pivotally held upon the machine, substantially as described.

3. A scraper comprising a swinging draft bail and blade arranged between sides or fenders which prevent the scraped up earth from spreading, and a toothed soil breaker arranged to rise and fall in correspondence with the blade and attached to a holder which is removably supported upon the machine, substantially as described.

4. A scraper comprising a swinging draft bail and blade arranged between sides or fenders which prevent the earth from spreading, a toothed soil breaker movable up and down in unison with the blade, a lever by which the blade is raised and lowered, and a connection between said lever and the soil breaker, substantially as described.

5. A scraper comprising the blade arranged for up and down adjustment, the toothed soil-breaker arranged for up and down movement in advance of the blade, and a wiper for cleaning the teeth of the soil-breaker, substantially as described.

6. A scraper comprising a pair of sides or fenders which prevent the scraped up soil from spreading, and the draft bail I, blade D, toothed soil breaker C, and wiper K, all arranged between said sides or fenders and adapted for operation, substantially as described.

BENJAMIN F. SHUART.

Witnesses:
W. D. MIDDLETON,
CHAS. G. PAGE.